UNITED STATES PATENT OFFICE.

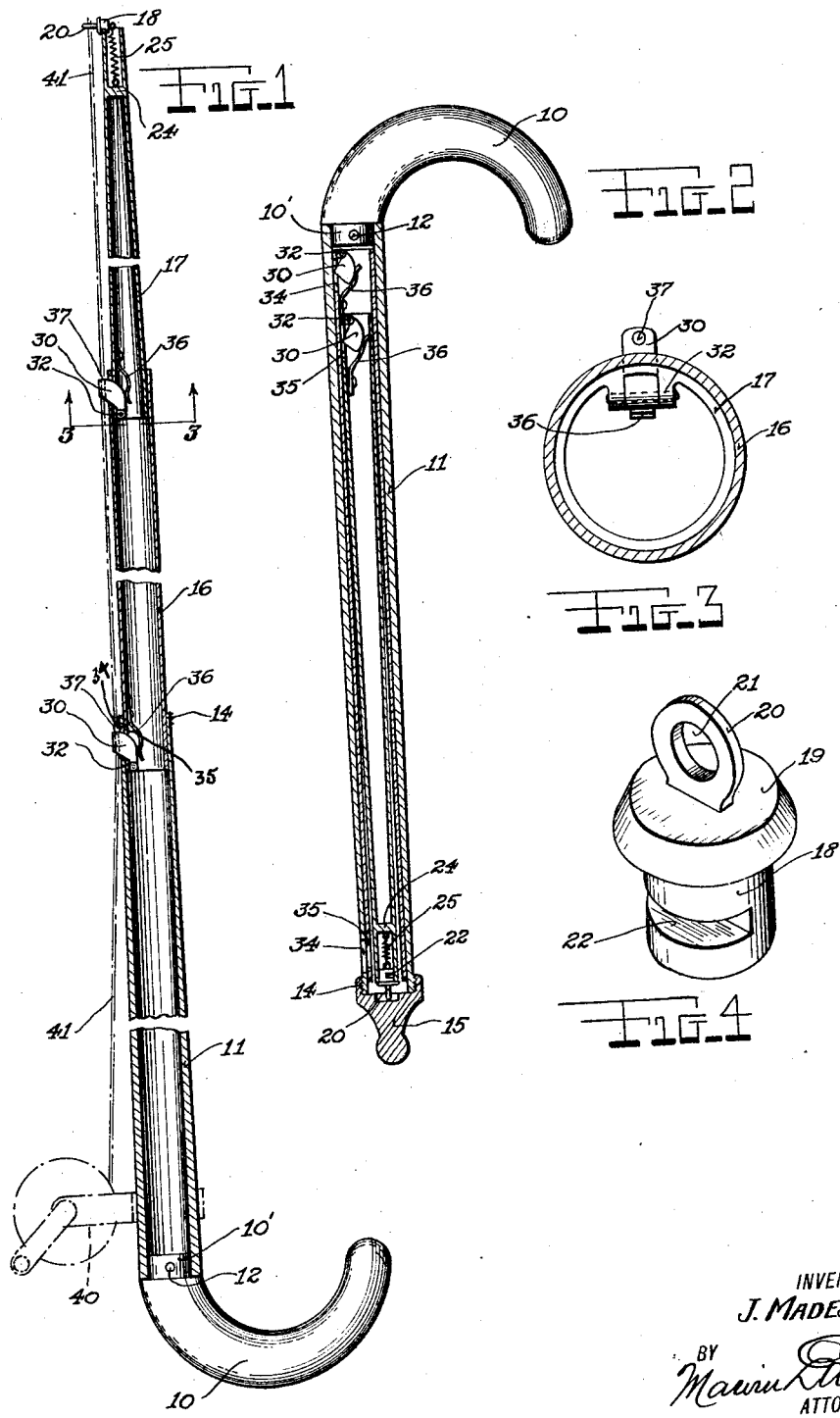

JÓZEF MADEJ, OF TOLLESTON, INDIANA.

FISHING ROD.

1,406,268.  Specification of Letters Patent.  Patented Feb. 14, 1922.

Application filed July 20, 1921. Serial No. 486,141.

*To all whom it may concern:*

Be it known that I, JÓZEF MADEJ, citizen of the United States, residing at Tolleston, in the county of Lake and State of Indiana, have invented certain new and useful Improvements in Fishing Rods, of which the following is a specification.

The principal object of this invention is to provide a fishing rod having collapsible means for convenient transportation.

Another object is the provision of means whereby the guides and ferrule may be interiorly disposed when not in use and the device used as a cane.

A third object is the means provided for automatically locking the telescoping sections when extended.

These and other like objects are attained by the novel construction, combination and arrangement of parts, hereinafter described and shown in the accompanying drawings, forming an essential part of this disclosure, and in which:—

Figure 1 is a longitudinal sectional view, showing the device in an extended position.

Figure 2 is a longitudinal sectional view showing the device in a closed or carrying position as a cane.

Figure 3 is an enlarged transverse sectional view taken on the line 3—3 of Figure 1.

Figure 4 is an enlarged perspective view of the line ferrule or tip.

Referring to the drawings in detail, the numeral 10 designates a curved handle as used on umbrellas, canes and like articles.

A tublar casing 11, having a cylindrical interior, is secured to the handle 10 by a pin 12 passing through its stem 10′ the outer diameter of the casing being gradually reduced throughout its length and a screw-threaded band 14 is formed on the opposite end of the casing adapted to engage a ferruled tip 15.

An intermediate tubular element 16, of uniform diameter, is adapted to slidably engage interiorly the casing 11.

Another tubular element 17 engages within the tube 16, its outwardly extending portion being of gradually reduced diameter, the smaller outer end being adapted to receive a plug 18. This plug has a flanged head 19 carrying a projecting arcuately formed element 20 pierced by an annular opening 21, forming, when in operative position a line guide, its plug portion containing a slot 22, the bottom of which is in parallel alignment with the element 20 and adapted to engage upon the end of the tube 17 as shown by Figure 1.

A disc closure 24, secured within the tube 17, is provided with a hook for attaching a spring 25, the opposite end of which is similarly connected to the plug 18, holding the same in retracted position, as shown in Figure 2, or in the operative position as in Figure 1.

Combined detents and line guides 30, pivotally secured within bearings 32, are fixed interiorly of the tubes 16 and 17, near their inner ends and rectangular openings 34 and 35 in register when the tubes 16 and 17 are extended, permit the guides 30 to be forced outward by the springs 36, secured inside the tubes 16 and 17 over the openings 34 and 35.

Annular openings 37 forming guides, through which a fish line may be threaded, are provided in the outwardly projecting portion of the elements 30.

Referring to the Figure 1 it will be seen that slight pressure on the pivoted guides will depress them so that the tubular elements may be closed or telescoped in to one another. Or in extending the tubes the guides will automatically spring outward when the openings 34 and 35 are in alignment, locking the sections in fixed position.

A line reel 40 may be attached if desired and a line 41 threaded along the rod and out of the opening 21 as shown by dotted lines in Figure 1.

When it is desired to use the device as a cane, the plug 18 is raised from off the end of the tube and turned, permitting the spring to pull the flange 19 over the end of the tube, the tubes pressed into the casing and the tip 15 screwed thereover, preventing the entrance of dirt and affording a firm and substantial support.

Having thus described my invention what I claim as new and desire to secure by Letters Patent, is:—

1. A fish pole comprising a hollow casing having a handle fixed at one end and an external screwthread at the other, there being a slot near the threaded end, a cylindrical tube slidable in said casing, a spring actuated detent pivotally engaged therein, said detent operatively engaging the casing slot when the tube is extended, a hollow conic end element, a second detent similarly carried thereby engaging a slot in said tube, a movable plug at the end of said conic element, said detents and plug containing guide openings for a line when extended, and a cap tip adapted to engage the screw thread on said casing maintaining said elements therewithin when they are retracted.

2. A fish pole comprising tubular telescopic sections, spring detents engaging said sections when extended, said detents also acting as line guides, a spring actuated plug normally engaging the end of the innermost section, said plug having means permitting it to be disposed transversely over the end and for guiding a line when so disposed, and means for closing the entrance to said sections when collapsed for use as a cane.

3. A fish pole comprising a hollow casing having a handle fixed at one end, a hollow extensible element, an intermediate tubular section disposable in said casing and receptive of said extensible element, a cup fitting said casing opposite said handle when all of said elements are retracted, a plug fitting the outer end of said extensible element, said plug having a flange and containing a transverse recess, a spring fixed in said element adapted to normally seat said flange on the end of the element, said spring also holding said plug when its slot is engaged with the end of said extensible element, and means on the outer end of said plug for guiding a line.

In witness whereof I affix my signature.

JÓZEF MADEJ.